May 21, 1957  G. V. WOODLING  2,793,059
SEALED THREADED CONNECTION
Filed July 22, 1954  2 Sheets-Sheet 1

INVENTOR.
George V. Woodling

INVENTOR.
George V. Woodling

2,793,059

SEALED THREADED CONNECTION

George V. Woodling, Cleveland, Ohio

Application July 22, 1954, Serial No. 445,139

4 Claims. (Cl. 285—220)

My invention relates in general to a threaded connection for engagement with an opening in a body and more particularly to a pipe threaded connection for engagement with a pipe threaded opening in a body.

Throughout the course of the years, it has been a recognized fact that pipe threads leak. Many devices have been employed to prevent the leakage of pipe threads but without complete success. My invention solves the pipe thread problem of leakage.

An object of my invention is the provision of a pipe threaded connection which has positive means incorporated therewith to prevent leakage.

Another object of my invention is the provision of providing a male pipe threaded connection which may be used in a standard female pipe threaded opening.

Another object of my invention is the provision of an insert member mounted in the female pipe threaded opening against which a male pipe threaded member wedgingly engages for laterally swedging the pipe threaded male member against the inner annular wall of the opening to make a tight fluid seal.

For a T or an elbow connection, it is essential with a pipe threaded connection that the T or the elbow fitting points in the proper direction when the pipe threaded connection is tight. In practice, a T or elbow fitting may not always point in the right direction when the pipe fitting connection is tight and under these circumstances, the operator usually backs off the pipe fitting connection until the T or elbow fitting points in the right direction.

It is also an object of my invention to provide a resilient insert member so that the T or elbow fitting may be resiliently turned against the insert member for a sufficient amount to permit the T or elbow fitting to point in the proper direction without backing up the pipe threaded connection.

Other objects and a fuller understanding of my invention may be had by referring to the following description and claims taken in conjunction with the accompanying drawings in which:

Figure 1:
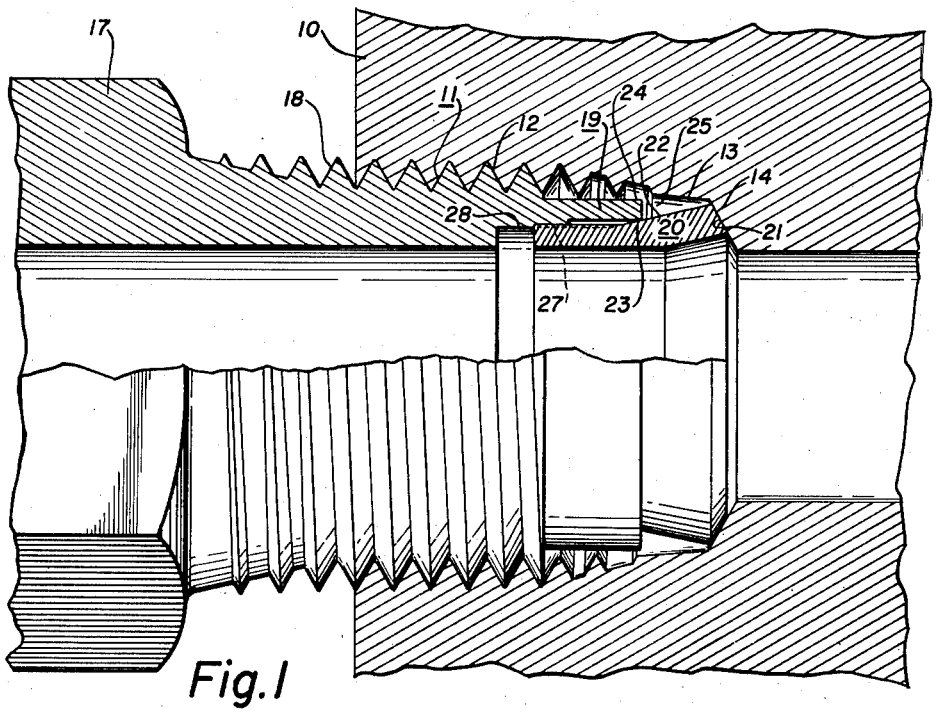
Figure 1 is a side view, partly in cross-section, showing a pipe threaded connection embodying the features of my invention, the drawing being for a one-half inch pipe thread enlarged four times size.

With reference to the drawings, the reference character 10 illustrates a body having an opening 11 therein into which the fitting 17 may be threadably engaged. The opening 11 has an entrance end and is defined by an inner annular wall extending inwardly into said body. The inner annular wall is provided next adjacent to the entrance end with female pipe threads 12. The right hand end of the pipe threads 12 terminate into a tapered portion 13. As illustrated, the tapered portion 13 terminates in a laterally disposed surface 14. The fitting 17 has a male pipe threaded portion 18 which threadably engages the female pipe threads 12 of the opening. As illustrated, in Figure 4, the male pipe threads 18 are intentionally made slightly smaller than what they would normally be for a conventional male pipe thread. This is to permit the male pipe threads 18 of my invention to screw well into the female pipe threads 12 without becoming wedgingly tight as is in general practice. The right hand end of the male pipe threads 18 are removed for a distance approximately two or more full threads to provide a hollow tubular section 19 which is adapted to be laterally wedged outwardly against the tapered portion 13 of the body 10. The outside surface 24 of the hollow tubular section 19 is relatively smooth to make a good seal with the tapered portion 13.

The swedging of the hollow tubular section 19 outwardly against the tapered portion 13 of the body is accomplished by means of an insert member 20. The right hand end of insert member 20 is provided with abuttable surface 21 which engages the laterally disposed surface 14 of the body to limit the movement of the insert member 20 into the opening 11. The outside of the insert member is provided with a flared surface 22 against which the hollow tubular section 19 wedgingly engages as the fitting 17 is screwed into the threaded opening 11. The flared surface 22 faces the entrance end of the hole 11 and provides in combination with the tapered portion 13 an annular converging recess 25 which is substantially triangular into which the hollow tubular section 19 is forced. The outside surface on the left hand end of the insert member 20 is provided with a knurled portion 27 which is pressed longitudinally into a counterbore 28 of the male pipe threaded portion 18. The knurled portion 27 is preferably provided with longitudinal knurls constituting longitudinal ridges and grooves, the bottom of the grooves being indicated by the dotted line. In manufacture, the insert member 20 is pressed into the counterbore 28 with the ridges of the knurled portion 27 making their own grooves into the counterbore 28. In the manufacture, the insert member 20 becomes physically attached to the end of the male pipe threaded portion 18.

In assembly, the male pipe threaded portion 18 is screwed into the opening 11 in the ordinary manner until the abuttable end surface 21 of the insert member 20 engages the laterally disposed surface 14, see Figure 1. Further turning of the male pipe threaded portion 18 into the opening 11 causes the inner contact surface 23 at the forward end of a hollow tubular section 19 to ride up the flared surface 22 until the outer wall surface 24 engages the tapered portion 13. Continued further turning of the male pipe threaded portion 18 into the threaded opening 11 forces the hollow tubular section 19 further into the converging triangular recess 25 until a good tight fluid seal is perfected.

The wall thickness of the insert member is such that the body thereof tends to resiliently collapse a very slight amount as the male threaded portion 18 is forced into the opening 11 to give a tight resilient connection, so that with T and elbow fittings the operator may continue to turn the fitting until it points in the right direction. For a steel fitting, the insert member is preferably constructed of steel capable of being quench hardenable throughout its entire mass and thereafter tempered or drawn back to a hardness value greater than that of the hollow tubular section 19. I find that steel known as 4140, heat treated throughout its entire mass and tempered to a hardness value of approximately 30 to 50 Rockwell, is satisfactory for my insert member, the harden value being preferably in the neighborhood of 38 to 42 Rockwell. The wall thickness of the hollow tubular section 19 may be preferably in the neighborhood of .035 to .065 inch and the wall section under the flared surface 22 may be preferably .050 to .075 inch. As a result, the insert member may be slightly collapsed as the male pipe threaded portion 18 is screwed into the threaded opening 11 to provide a tight resilient connection. As the hollow tubular section 19 rides upon the flared surface 22, the knurls 27 move deeper into the counterbore 28. The insert member has a bore substantially the same diameter as the bore in the fitting 17. The angle of the flared surface 22 is substantially 12 degrees. The wall thickness of the insert beneath the flared surface 22 is greater than the wall thickness of the hollow tubular section 19 so that the insert strongly and resiliently provides a supporting surface to swedge out the hollow tubular section 19. The wall thickness of the insert below the flared surface 22 is less than the wall thickness of the male pipe threaded portion 18 between the bore of the fitting 17 and the root diameter of the threads.

Figure 4:
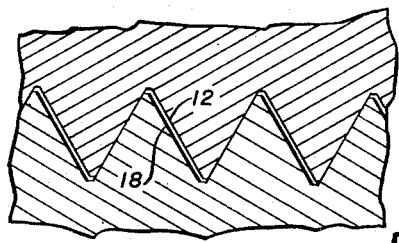
Figure 4 shows an enlarged fragmentary view of the pipe threads.

As shown in Figure 4, the pipe threads 18 are made slightly smaller than the female pipe threads 12 so that in the final tight position, the male pipe threads 18 do not become tight in the female pipe threads 12. The main function of the male pipe threads 18 is to make a good mechanical engagement because the fluid seal is effected by the hollow tubular section 19 fitting tightly in the converging triangular recess 25. On disassembly of the male pipe threaded portion 18, the insert member 20 comes out with the hollow tubular section 19 so that everything remains as an assembled unit.

Figure 2:
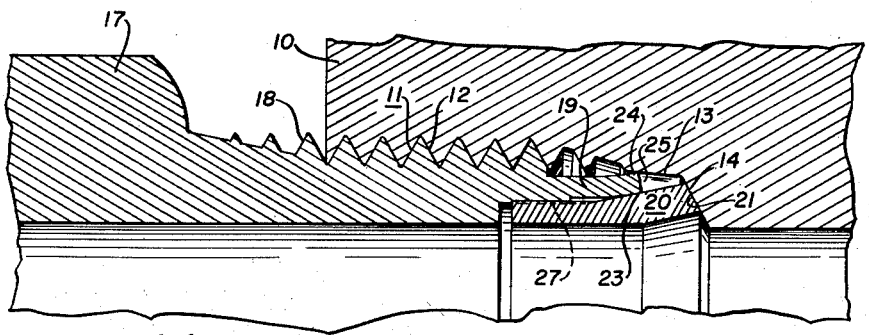
Figure 2 is a fragmentary view of Figure 1 showing the pipe threaded connection in its finally assembled position.
Figure 3:
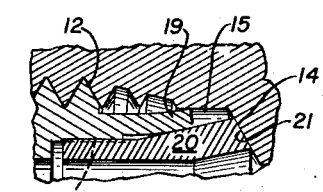
Figure 3 is a fragmentary view of the right hand end of Figure 2, showing a modified arrangement of my invention.
Figure 5:
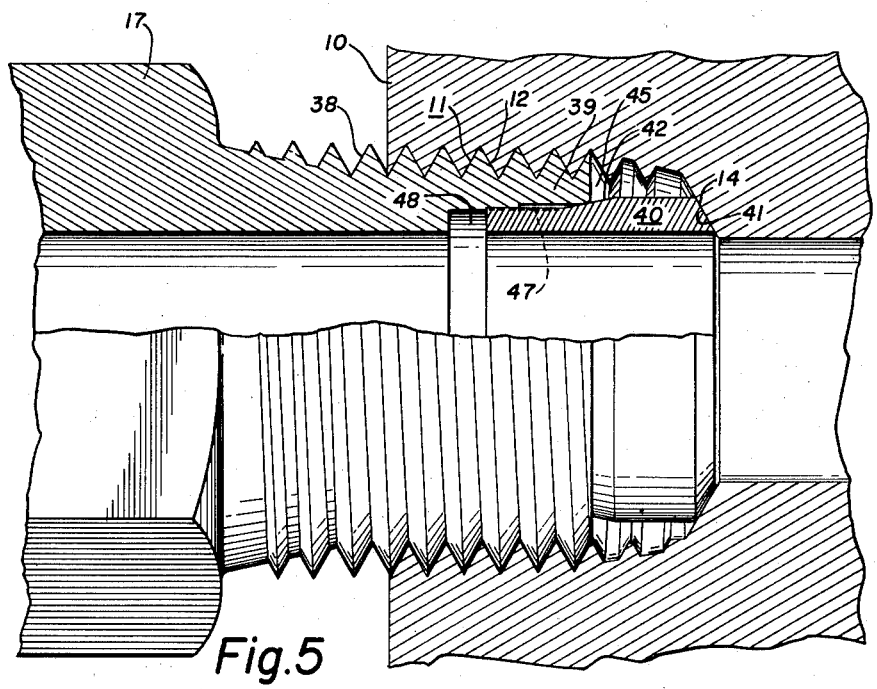
Figure 5 is a view similar to Figure 1 which shows a modified form of the invention.

In making a female pipe thread opening, it is sometimes the practice to make the surface 13 on a taper as illustrated in Figures 1 and 2. Then, again it is sometimes the practice to make this surface substantially cylindrical such as in Figure 3, where I show a modified form of the invention in that the tapered portion 13 has been replaced by a substantially cylindrical portion 15. Otherwise the Figure 3 is identical to Figures 1 and 2. As a third variation, the female pipe thread may extend substantially all the way up to the laterally disposed surface 14 as shown in Figure 5 which shows another modified form of my invention. In this Figure 5, the male pipe threaded portion 38 does not have the threads on the end thereof removed, in which event the tubular extension 39, instead of being smooth, is provided with pipe threads on the outside surface thereof. The insert member 40 has also been modified to accommodate the arrangement shown in Figure 5. In this embodiment the flared surface 42 defines in combination with the female pipe threads a converging annular recess 45 into which the threaded tubular extension 39 wedgingly fits. The right hand end of the insert member 40 is provided with an end abuttable surface 41 for engaging the laterally disposed surface 14 of the body 10. The left hand end of the insert member 40 is provided with a knurl portion 47 which fits into a counterbore 48, so that the insert member becomes physically attached to the end of the male pipe thread portion 38.

In assembly, the male pipe threaded portion 38 is screwed into the threaded opening 11 until the abuttable end surface 41 engages the laterally disposed surface 14 of the body 10. Further turning of the male pipe threaded portion 38 into the threaded opening 11 causes the hollow tubular section 39 to be forced into the converging recess 45, with the result that a good fluid seal is provided therebetween. In the expanded position of the threaded tubular extension 39, the male threads on the right hand end of the tubular extension 39 are forced tightly into the female threads for making a good fluid seal.

Figure 6:
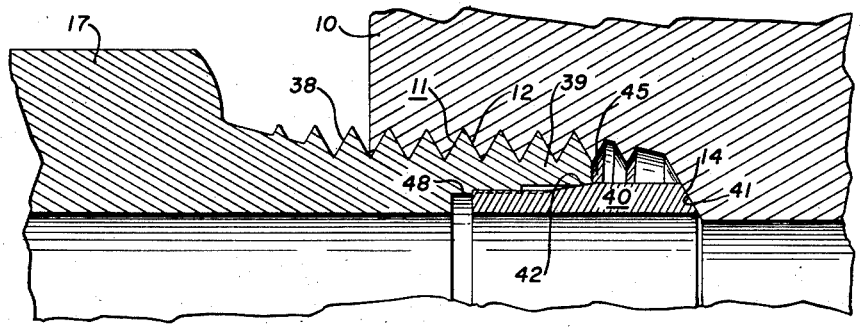
Figure 6 shows the invention of Figure 5 in its finally assembled position.

The Figure 6 shows the parts of Figure 5 in the final assembled position. The thickness of the insert member 40 is preferably in the neighborhood of .085 to .01 of an inch so that a good resilient fit is made. The insert member 40 tends to slightly collapse as the male pipe threaded portion 38 is turned tight into the opening 11. As shown in Figure 4, the male pipe threads 38 are made slightly smaller than the female threads 11 so that the male pipe threads do not become tight into the female pipe threads in which even the pipe threads afford a mechanical connection, because the fluid seal is made at the forward end of the tubular extension 39.

The angle of the flared surface 42 is substantially 12 degrees. The wall thickness of the insert beneath the flared surface 42 is greater than the wall thickness of the hollow tubular section 39 so that the insert strongly and resiliently provides a supporting surface to swedge out the hollow tubular section 39. The wall thickness of the insert below the flared surface 42 is less than the wall thickness of the male pipe threaded portions 38 between the bore of the fitting 17 and the root diameter of the threads.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A connection for engagement with an internal annular wall in a body, said internal annular wall extending inwardly into said body and terminating in a laterally disposed terminating surface, said internal annular wall having a portion thereof provided with female threads and having another portion thereof next adjacent to said laterally disposed terminating surface provided with a relatively smooth surface, said connection comprising an insert member and a male member mountable inside of said internal annular wall, said insert member having first and second end portions and a diverging flare portion therebetween, said first end portion having a smaller external diameter than said second end portion with the diverging flare portion increasing in diameter as it approaches said second end portion, said second end portion of said insert member having an abuttable surface for engaging said laterally disposed terminating surface within said internal annular wall to limit inward movement of said insert member within said internal annular wall, said male member having male threads thereon for engagement with said female threads and having a hollow forward end portion defining an annular wall section, said annular wall section having an external contact surface for engaging the smooth surface of the internal annular wall in said body and having an internal contact surface for engaging the diverging flare portion of the insert member, said annular wall section also having an interfitting contact surface into which the first end portion of said insert member fits to hold said insert member within the hollow forward end portion of the male member, said male and female threads upon relative turning of said male threads within the female threads forcing said male member and said insert member inwardly of said internal annular wall and pressing the abuttable surface of the second end portion of said insert member against the laterally disposed terminating surface within said internal annular wall, said male member and said insert member upon being forced into said internal annular wall also urging the internal contact surface of the annular wall section wedgingly against said diverging flare surface of the insert member and thereby laterally swedging the external contact surface of the annular wall section of the male member sealingly against the smooth surface of the internal annular wall in the body, the wall of the insert member under the diverging flare surface being resiliently collapsible to provide an impositive stop to the further turning of the male threads into the female threads.

2. A connection for engagement with an internal annular wall in a body, said internal annular wall extending inwardly into said body and terminating in a laterally disposed terminating surface, said internal annular wall having a portion thereof provided with female threads and having another inner portion thereof next adjacent to said laterally disposed terminating surface provided with a relatively smooth surface, said connections comprising an insert member and a male member mountable inside of said internal annular wall, said insert member having first and second end portions and a diverging flare portion therebetween, said first end portion having a smaller external diameter than said second end portion with the diverging flare portion increasing in diameter as it approaches said second end portion, said second end portion of said insert member having an abuttable surface for engaging said laterally disposed terminating surface within said internal annular wall, said laterally disposed terminating surface being convergingly tapered to impositively limit inward movement of said insert member within said internal annular wall, said male member having male threads thereon for engagement with said female threads and having a hollow forward end portion defining an annular wall section, said annular wall section having an external contact surface for engaging the smooth surface of the internal annular wall in said body and having an internal contact surface for engaging the diverging flare portion of the insert member, said annular wall section also having an interfitting contact surface into which the first end portion of said insert member fits to hold said insert member within the hollow forward end portion of the male member, said male and female threads upon relative turning of said male threads within the female threads forcing said male member and said insert member inwardly of said internal annular wall and pressing the abuttable surface of the second end portion of said insert member against the laterally disposed terminating surface within said internal wall, said male member and said insert member upon being forced into said internal annular wall also urging the internal contact surface of the annular wall section wedgingly against said diverging flare surface of the insert member and thereby laterally swedging the external contact surface of the annular wall section of the male member sealingly against the smooth surface of the internal annular wall in the body, the wall of the insert member under the diverging flare surface being resiliently collapsible to provide an impositive stop to the further turning of the male threads into the female threads.

3. A connection for engagement with an internal annular wall in a body, said internal annular wall extending inwardly into said body and terminating in a laterally disposed terminating surface, said internal wall having female threads, said connection comprising an insert member and a male member mountable inside of said internal annular wall, said insert member having first and second end portions and a diverging flare portion therebetween, said first end portion having a smaller external diameter than said second end portion with the diverging flare portion increasing in diameter as it approaches said second end portion, said second end portion of said insert member having an abuttable surface for enegaging said laterally disposed terminating surface within said internal annular wall to limit inward movement of said insert member within said internal annular wall, said male member having male threads thereon for engagement with said female threads and having a hollow forward end portion defining an annular wall section, said annular wall section having an external contact surface for engaging the internal annular wall in said body and having an internal contact surface for engaging the diverging flare portion of the insert member, said annular wall section also having an interfitting contact surface into which the first end portion of said insert member fits to hold said insert member within the follow forward end portion of the male member, said male and female threads upon relative turning of said male threads within the female threads forcing said male member and said insert member inwardly of said internal annular wall and pressing the abuttable surface of the second end portion of said insert member against the laterally disposed terminating surface within said internal annular wall, said male member and said insert member upon being forced into said internal annular wall also urging the internal contact surface of the annular wall section wedgingly against said diverging flare surface of the insert member and thereby laterally swedging the external contact surface of the annular wall section of the male member sealingly against the internal annular wall in the body, the wall of the insert member under the diverging flare surface being resiliently collapsible to provide an impositive stop to the further turning of the male threads into the female threads.

4. A connection for engagement with an internal annular wall in a body, said internal annular wall extending inwardly into said body and terminating in a laterally disposed terminating surface, said internal annular wall having female threads, said connection comprising an insert member and a male member mountable inside of said internal annular wall, said insert member having first and second end portions and a diverging flare portion therebetween, said first end portion having a smaller external diameter than said second end portion with the diverging flare portion increasing in diameter as it approaches said second end portion, said second end portion of said insert member having an abuttable surface for engaging said laterally disposed terminating surface within said internal annular wall to limit inward movement of said insert member within said internal annular wall, said male member having male threads thereon for engagement with said female threads and having a hollow forward end portion defining an annular wall section, said annular wall section having an external contact surface for engaging the internal annular wall in said body and having an internal contact surface for engaging the diverging flare portion of the insert member, means for securing said member to said annular wall section, said male and female threads upon relative turning of said male threads within the female threads forcing said male member and said insert member inwardly of said internal annular wall and pressing the abuttable surface of the second end portion of said insert member against the laterally disposed terminating surface within said internal annular wall, said male member and said insert member upon being forced into said internal annular wall also urging the internal contact surface of the annular wall section wedgingly against said diverging flare surface of the insert member and thereby laterally swedging the external contact surface of the annular wall section of the male member sealingly against the internal annular wall in the body, the wall of the insert member under the diverging flare surface being resiliently collapsible to provide an impositive stop to the further turning of the male threads into the female threads.

References Cited in the file of this patent
UNITED STATES PATENTS

| 1,080,430 | Ferrell et al. | Dec. 2, 1913 |
| 1,237,249 | Goodall | Aug. 14, 1917 |
| 1,895,845 | D'Halloy | Jan. 31, 1933 |